(No Model.) 2 Sheets—Sheet 1.
H. SKINNER.
MOTOR TRUCK FOR STREET CARS.
No. 371,383. Patented Oct. 11, 1887.
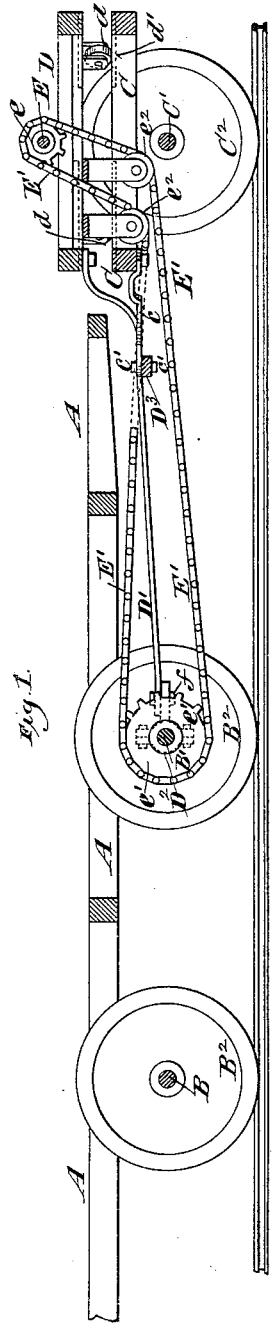
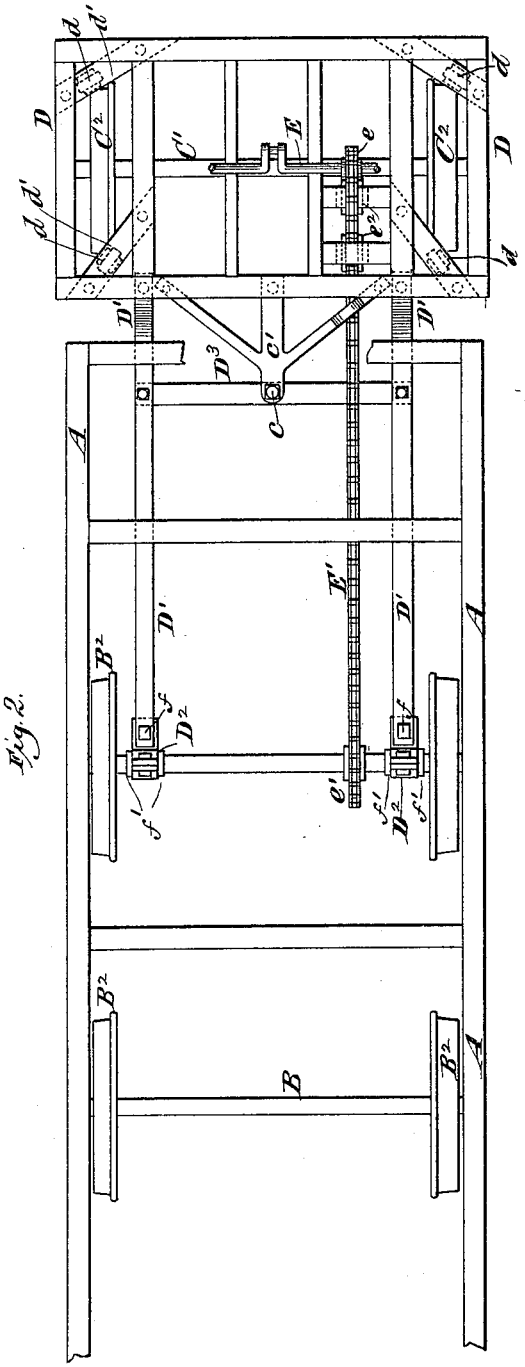
Witnesses:
Inventor:

(No Model.) 2 Sheets—Sheet 2.
H. SKINNER.
MOTOR TRUCK FOR STREET CARS.
No. 371,383. Patented Oct. 11, 1887.
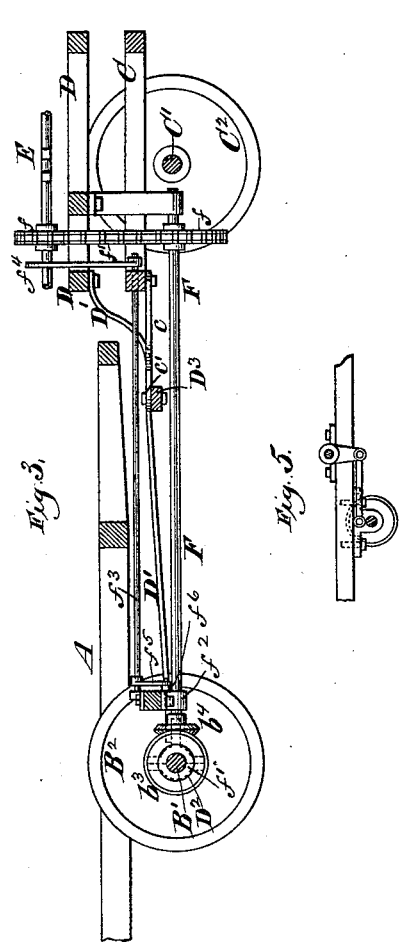
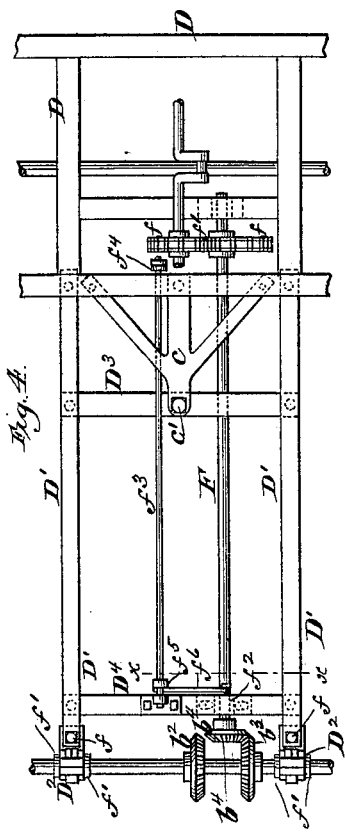

UNITED STATES PATENT OFFICE.

HALCYON SKINNER, OF YONKERS, NEW YORK.

MOTOR-TRUCK FOR STREET-CARS.

SPECIFICATION forming part of Letters Patent No. 371,353, dated October 11, 1887.

Application filed February 9, 1887. Serial No. 227,009. (No model.)

*To all whom it may concern:*

Be it known that I, HALCYON SKINNER, of Yonkers, in the county of Westchester and State of New York, have invented a new and useful Improvement in Motor-Trucks for Street-Cars, of which the following is a specification.

In the attempts which have heretofore been made to adapt a motor or engine, whether operated by steam, gas, compressed air, or electricity, to street-cars, the motor has usually been placed upon a truck entirely separate from the car and coupled to the car or cars in the same manner that a locomotive is coupled to its train, or the motor has been placed on the same car which carries the passengers and without the employment of an independent truck for the motor. In the first arrangement the motor and its truck must be made heavy and at comparatively great cost in order to give the necessary traction, because the motor depends on the adhesive power of its wheels to pull the car or cars, and in the latter case the car must be made considerably larger and stronger than the ordinary street-car in order to make room for the motor, which could not be used on cars already built without taking up a large part of the room required for passengers, and according to this latter arrangement a separate motor must be provided for every car of a railway, whether it is used continuously or not.

In carrying out my invention I employ a separate motor-truck, which is connected with the car truck or body; and one object of my invention is to so transmit power from the motor-shaft to the car truck or body that the power of the motor does not depend in any degree on the adhesive power of the wheels of its own truck, but on the adhesive power of the wheels of the car. I combine with a car truck or body and a motor-truck separate therefrom, but connected therewith, a motor-shaft on the motor-truck, which has no driving-connection with the axle or axles of the truck, and gearing connecting said shaft with one of the car-axles.

The invention also consists in the combination, with a car truck or body and a motor-truck so connected with the car-truck as to provide for its lateral movement independent of the car truck or body, of an upper frame supported on the motor-truck and so connected with one of the car-axles that it is held in parallel relation thereto, a motor-shaft on said upper frame, and gearing connecting said motor-shaft with one of the car-axles.

Inasmuch as according to my invention the power is transmitted from the motor-shaft which is on the separate truck direct to one of the axles of the car, and not to the axle of the motor-truck, but a single axle and pair of wheels are necessary for the motor-truck.

The invention also consists in novel combinations of parts, which are hereinabove referred to and hereinafter described, and pointed out in the claims.

In the accompanying drawings, Figure 1 is a longitudinal sectional elevation, and Fig. 2 is a plan, of such portions of a car truck or body and an independent motor-truck as are necessary to illustrate my invention, the car being driven by chain gearing leading from the motor-shaft on the motor-truck to one of the car-axles. Figs. 3 and 4 are respectively a sectional view and a plan, corresponding to Figs. 1 and 2, of a portion of the car truck or body and a motor-truck illustrating a modification of my invention; and Fig. 5 is a detail sectional view of parts upon the plane indicated by the dotted line $x\,x$, Fig. 4.

Similar letters of reference designate corresponding parts in all the figures.

A designates a portion of a car truck or body, which is supported in the usual way upon the axles B B', on which are the wheels B². This car may be similar to the ordinary street-cars now in use. The truck which is to support the motor for driving the car is made entirely separate from the car truck or body A, and constitutes a structure by itself, which may be readily disconnected from one car truck or body and as readily connected with another car.

C designates the motor-truck proper, which may be supported in the usual way upon the axle C', having wheels C², and either a single axle and pair of wheels, as here represented, may be used, or the truck may be provided with two or more axles and two or more pairs of wheels.

The motor, whether it be a steam, compressed-air, gas, or electric motor, is not usually supported directly upon the motor-truck C, but is supported upon the upper frame, D, which, while it is itself sustained by the motor-truck, permits the free movement of the motor-truck beneath it, in order that it may adapt itself to the curves and other irregularities in the line of track. This upper frame, D, is in this example of my invention supported by rollers or anti-friction wheels $d$, which bear upon plates $d'$ upon the motor-truck C, as is best shown in Figs. 1 and 2, and on the upper frame, D, is a crank-shaft or other motor-shaft, E. The power from the motor-shaft E is not transmitted to the axle C' of the motor-truck C, as is usual, but is transmitted to one of the car-axles—the axle B', for example—and therefore the weight of the motor-truck and the adhesion of its wheels C' upon the track-rails have no effect, practically, upon the power transmitted from the motor to the car.

In the example of my invention shown in Figs. 1 and 2 power is transmitted from the motor-shaft E through an endless driving-chain, E', which passes over a sprocket-wheel, $e$, upon the motor-shaft E, and also around a similar wheel, $e'$, on the axle B'. This chain also passes under suitable guide-pulleys, $e^2$, to give it proper direction. Now, in order to enable the chain to drive properly, the upper frame, D, which is movable relatively to the motor-truck C, or which affords freedom for the movement of the truck relatively to it, should be so connected with the axle of the car truck or body A as to be maintained parallel therewith, and this result I accomplish by connecting the upper frame, D, with the axle B' at points on opposite sides of the center by means of pairs of arms D', which are best shown in Fig. 2, and which may be secured each by a bolt, $f$, to the boxes D² upon the axle B'. These boxes D² permit the axle to turn readily within them, and they permit the upper frame, D, and the motor-truck C to rise and fall relatively to the car truck or body A; but they do not permit any lateral movement of the upper frame, D, relatively to the car truck or body A, as the boxes D² are held against lengthwise movement of the shaft B' by collars $f'$ on opposite sides of said boxes, as shown in Fig. 2, or by other suitable means.

The motor-truck C has a connection with the car truck or body A, which permits its lateral movement relatively to the car-body, and in this example of my invention the motor-truck C has a rearwardly-extending arm or hanger, $c$, which is secured by a bolt, $c'$, to a bar or cross-piece, D³, connecting the two pairs of arms D'. Through this bar or cross-piece D³ the motor-truck is so connected with the car truck or body that it is free to move laterally relatively to the car truck or body in order to take the curves and inequalities in the track.

It will be observed that the rollers $d$, which are interposed between the upper frame, D, and the motor-truck C, should have their axes radial to the pivotal point $c'$ of connection between the motor-truck and the cross-bar D³, which in this example of my invention constitutes the indirect connection between the motor-truck and the car truck or body, so as to work with the greatest ease.

In the example of my invention shown in Figs. 3, 4, and 5 the upper frame, D, is supported upon a motor-truck, C, in a manner similar to that before described, although in Fig. 3 I have not thought necessary to show the rollers which are represented in Figs. 1 and 2. The arrangement of parts shown in Figs. 3 and 4 may be adopted when the motor-shaft E is arranged upon the upper frame, D, with its axis approximately parallel with the car truck or body, and the arrangement of gearing shown in Figs. 3 and 4 is adapted for that arrangement of the motor-shaft. In Fig. 4 I have not shown any portion of the car truck or body, but simply a portion of one of the axles, B', to which power is transmitted from the motor-shaft E. In this example of my invention the pairs of arms D' which are connected with the boxes D² have, in addition to the cross bar or piece D³, a second cross bar or piece, D⁴, and F designates a shaft which extends lengthwise of the car-body and approximately parallel with the pairs of arms D'. The shaft E may, by sprocket-wheels $ff$ and a chain, $f'$, or by other suitable gearing, transmit motion to the shaft F. In Figs. 3 and 4 I have represented the axle B' as having upon it bevel-wheels $b^2 b^3$, between which is arranged a corresponding bevel-wheel, $b^4$, upon the shaft F. When the wheel $b^4$ is brought into engagement with the wheel $b^2$, motion will be transmitted to the axle B' in one direction, and when said wheel $b^4$ is brought into engagement with the other and reverse wheel, $b^3$, the axle B' will have motion imparted to it in the opposite direction.

Provision for reversing the motion may be afforded by shifting the shaft F laterally, so as to bring its wheel $b^4$ into engagement with either of the wheels $b^2 b^3$. The shaft may be mounted in a sliding box, $f^2$, adjacent to the wheel $b^4$, and by means of a rock-shaft, $f^3$, a hand-lever, $f^4$, and an arm and rod, $f^5 f^6$, the box $f^2$ may be shifted as desired. In this example of my invention, also, the truck-frame has a rearwardly-projecting arm or bracket, $c$, which is, at $c'$, pivotally connected with the cross piece or bar D³, and which is therefore indirectly connected with the car truck or body.

What I claim as my invention, and desire to secure by Letters Patent, is—

1. The combination, with a car truck or body and a motor-truck separate therefrom, but connected therewith, of a motor-shaft on the motor-truck, and gearing connecting said shaft with one of the car-axles, substantially as herein described.

2. The combination, with a car truck or body and a motor-truck so connected with the car truck or body as to provide for its lateral movement independent of the car-truck, but having no driving-connection with the axle or axles thereof or body, of an upper frame supported on the motor truck and so connected with one of the car-axles that it is held in parallel relation thereto, a motor-shaft on said upper frame, and gearing connecting said motor-shaft with one of the car-axles, substantially as herein described.

3. The combination, with a car truck or body and a motor-truck pivotally connected with the car truck or body, of an upper frame connected with one of the car-axles so as to maintain it parallel with said axle and supported on the motor-truck, a motor-shaft on said upper frame, and gearing connecting the motor-shaft and one of the car-axles, substantially as herein described.

4. The combination, with a car truck or body and a motor-truck having a single axle and pair of wheels made separate from and connected with the car truck or body, of a motor-shaft on the motor-truck and gearing connecting said shaft and one of the car-axles, substantially as herein described.

5. The combination, with a car truck or body and a motor-truck pivotally connected with the car, of the upper frame, D, supported on the motor-truck, and bars or arms D', connecting the said frame and a car-axle, B', and serving to maintain said frame parallel with said axle, a motor-shaft on said upper frame, and gearing connecting the motor-shaft and one of the car-axles, substantially as herein described.

HALCYON SKINNER.

Witnesses:
WM. P. KIELE,
CHS. E. POWELL.